US012759552B2

(12) United States Patent
Tsutsumi et al.

(10) Patent No.: US 12,759,552 B2
(45) Date of Patent: Oct. 13, 2026

(54) FOLLOWING TRAVEL CONTROL DEVICE, FOLLOWING TRAVEL CONTROL METHOD, AND NON-TRANSITORY RECORDING MEDIUM

(71) Applicant: TOYOTA JIDOSHA KABUSHIKI KAISHA, Toyota (JP)

(72) Inventors: Shuntaro Tsutsumi, Edogawa-ku Tokyo-to (JP); Shinji Ishikawa, Edogawa-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 56 days.

(21) Appl. No.: 18/962,128

(22) Filed: Nov. 27, 2024

(65) Prior Publication Data

US 2025/0178607 A1 Jun. 5, 2025

(30) Foreign Application Priority Data

Dec. 5, 2023 (JP) ................................ 2023-205179

(51) Int. Cl.

*B60W 30/165* (2020.01)
*B60W 30/18* (2012.01)
*B60W 60/00* (2020.01)

(52) U.S. Cl.

CPC .... *B60W 30/165* (2013.01); *B60W 30/18163* (2013.01); *B60W 60/001* (2020.02); *B60W 2554/4041* (2020.02); *B60W 2754/30* (2020.02)

(58) Field of Classification Search

None

See application file for complete search history.

(56) References Cited

U.S. PATENT DOCUMENTS

| | | | | |
|---|---|---|---|---|
| 10,845,813 | B2 * | 11/2020 | Ueda | B60W 40/04 |
| 2009/0271084 | A1 * | 10/2009 | Taguchi | B60W 30/16 701/96 |

(Continued)

FOREIGN PATENT DOCUMENTS

| | | |
|---|---|---|
| JP | 2004-082944 A | 3/2004 |
| JP | 2007-084056 A | 4/2007 |

(Continued)

OTHER PUBLICATIONS

Lu et. al., Modeling of Driver Cut-in Behavior Towards a Platoon, IEEE Transactions on Intelligent Transportation Systems, vol. 23, No. 12, Dec. 2022 (Year: 2022).*

*Primary Examiner* — Christian Chace
*Assistant Examiner* — Scott R Jagolinzer
(74) *Attorney, Agent, or Firm* — Dinsmore & Shohl LLP

(57) ABSTRACT

A following travel control device recognizes a preceding vehicle, performs following travel control in which a host vehicle follows the preceding vehicle, generates a target travel trajectory of the host vehicle which draws a travel track different from the travel track of the preceding vehicle, makes the host vehicle travel autonomously along the target travel trajectory, interrupts the following travel control when circumstances in which the following travel control cannot be continued occur while the following travel control is performed, continues to recognize the preceding vehicle, and generates the target travel trajectory which can restart the following travel control.

4 Claims, 4 Drawing Sheets

(56) References Cited

U.S. PATENT DOCUMENTS

| | | | | |
|---|---|---|---|---|
| 2016/0327947 | A1* | 11/2016 | Ishikawa | B60W 50/14 |
| 2017/0232966 | A1* | 8/2017 | Ishioka | B60W 30/16<br>701/96 |
| 2018/0120861 | A1* | 5/2018 | Saxena | G05D 1/0291 |
| 2019/0213882 | A1* | 7/2019 | Sachs | G08G 1/096783 |
| 2021/0110720 | A1 | 4/2021 | Bang | |
| 2021/0294351 | A1* | 9/2021 | Wiberg | G05D 1/0293 |
| 2022/0105941 | A1* | 4/2022 | Solar | G06V 20/58 |
| 2022/0266830 | A1* | 8/2022 | Cho | B60W 30/18163 |
| 2023/0073287 | A1* | 3/2023 | Iba | B60T 8/24 |
| 2023/0406301 | A1* | 12/2023 | Parks | B60W 30/12 |
| 2024/0025450 | A1* | 1/2024 | Churay | B60W 30/18163 |
| 2024/0140426 | A1* | 5/2024 | Jalaliyazdi | B60W 30/18163 |
| 2025/0128711 | A1* | 4/2025 | Moore | B60W 10/04 |
| 2025/0155890 | A1* | 5/2025 | Wang | G08G 1/096791 |

FOREIGN PATENT DOCUMENTS

| | | |
|---|---|---|
| JP | 2009-248892 A | 10/2009 |
| JP | 2022-161659 A | 10/2022 |

* cited by examiner

FOLLOWING TRAVEL CONTROL DEVICE, FOLLOWING TRAVEL CONTROL METHOD, AND NON-TRANSITORY RECORDING MEDIUM

CROSS-REFERENCE TO RELATED APPLICATIONS

This application claims priority to Japanese Patent Application No. 2023-20517 9 filed Dec. 5, 2023, the entire contents of which are herein incorporated by reference.

FIELD

The present disclosure relates to following travel control device, following travel control method, and non-transitory recording medium.

BACKGROUND

In PTL 1 (JPA 2007-084056), a technique in which a host vehicle follows a preceding vehicle is disclosed.

In the technique described in PTL 1, a case in which the host vehicle cannot follow the preceding vehicle (for example, a case in which vehicle (for example, cut-in vehicle), person (for example, road crosser, pedestrian running out into a road), traffic light, stop sign, railroad crossing or the like exists between the preceding vehicle and the host vehicle) is not considered. If following travel to the preceding vehicle by the host vehicle is continued in the case described above, there is a risk that vehicle, person or the like existing between the preceding vehicle and the host vehicle may contact the host vehicle or the host vehicle may not be able to stop in a place where a stop is required, it is not appropriate. On the other hand, even when circumstances in which the host vehicle cannot follow the preceding vehicle occur, there is a case in which a driver of the host vehicle wishes that the following travel to the preceding vehicle by the host vehicle is continuously performed by (an autonomous driving system of) the host vehicle.

SUMMARY

In view of the above-described points, it is an object of the present disclosure to provide following travel control device, following travel control method, and non-transitory recording medium that can appropriately continue the following travel to the preceding vehicle by the host vehicle even when the circumstances in which the host vehicle cannot follow the preceding vehicle occur.

(1) One aspect of the present disclosure is a following travel control device including a processor configured to: recognize a preceding vehicle; perform following travel control in which a host vehicle follows the preceding vehicle; generate a target travel trajectory of the host vehicle which draws a travel track different from the travel track of the preceding vehicle; make the host vehicle travel autonomously along the target travel trajectory; and interrupt the following travel control when circumstances in which the following travel control cannot be continued occur while the following travel control is performed, continue to recognize the preceding vehicle, and generate the target travel trajectory which can restart the following travel control.

(2) In the following travel control device of the aspect (1), the processor may be configured to determine whether recognition of the preceding vehicle is easy, and perform the following travel control by increasing the distance between the preceding vehicle and the host vehicle when it is determined that the recognition of the preceding vehicle is easy than when it is determined that the recognition of the preceding vehicle is not easy.

(3) In the following travel control device of the aspect (1) or (2), the target travel trajectory may be a travel trajectory of the host vehicle for overtaking an other vehicle which interrupted between the preceding vehicle and the host vehicle, the processor may be configured to acquire information indicating a situation of the host vehicle and determine whether overtaking of the other vehicle by the host vehicle is possible based on the information indicating the situation of the host vehicle.

(4) Another aspect of the present disclosure is a following travel control method including: recognizing a preceding vehicle; performing following travel control in which a host vehicle follows the preceding vehicle; generating a target travel trajectory of the host vehicle which draws a travel track different from the travel track of the preceding vehicle; making the host vehicle travel autonomously along the target travel trajectory; and interrupting the following travel control when circumstances in which the following travel control cannot be continued occur while the following travel control is performed, continuing to recognize the preceding vehicle, and generating the target travel trajectory which can restart the following travel control.

(5) Another aspect of the present disclosure is a non-transitory recording medium having recorded thereon a computer program for causing a processor to perform a process including: recognizing a preceding vehicle; performing following travel control in which a host vehicle follows the preceding vehicle; generating a target travel trajectory of the host vehicle which draws a travel track different from the travel track of the preceding vehicle; making the host vehicle travel autonomously along the target travel trajectory; and interrupting the following travel control when circumstances in which the following travel control cannot be continued occur while the following travel control is performed, continuing to recognize the preceding vehicle, and generating the target travel trajectory which can restart the following travel control.

According to the present disclosure, it is possible to appropriately continue the following travel to the preceding vehicle by the host vehicle even when the circumstances in which the host vehicle cannot follow the preceding vehicle occur.

DESCRIPTION OF EMBODIMENTS

Figure 1:
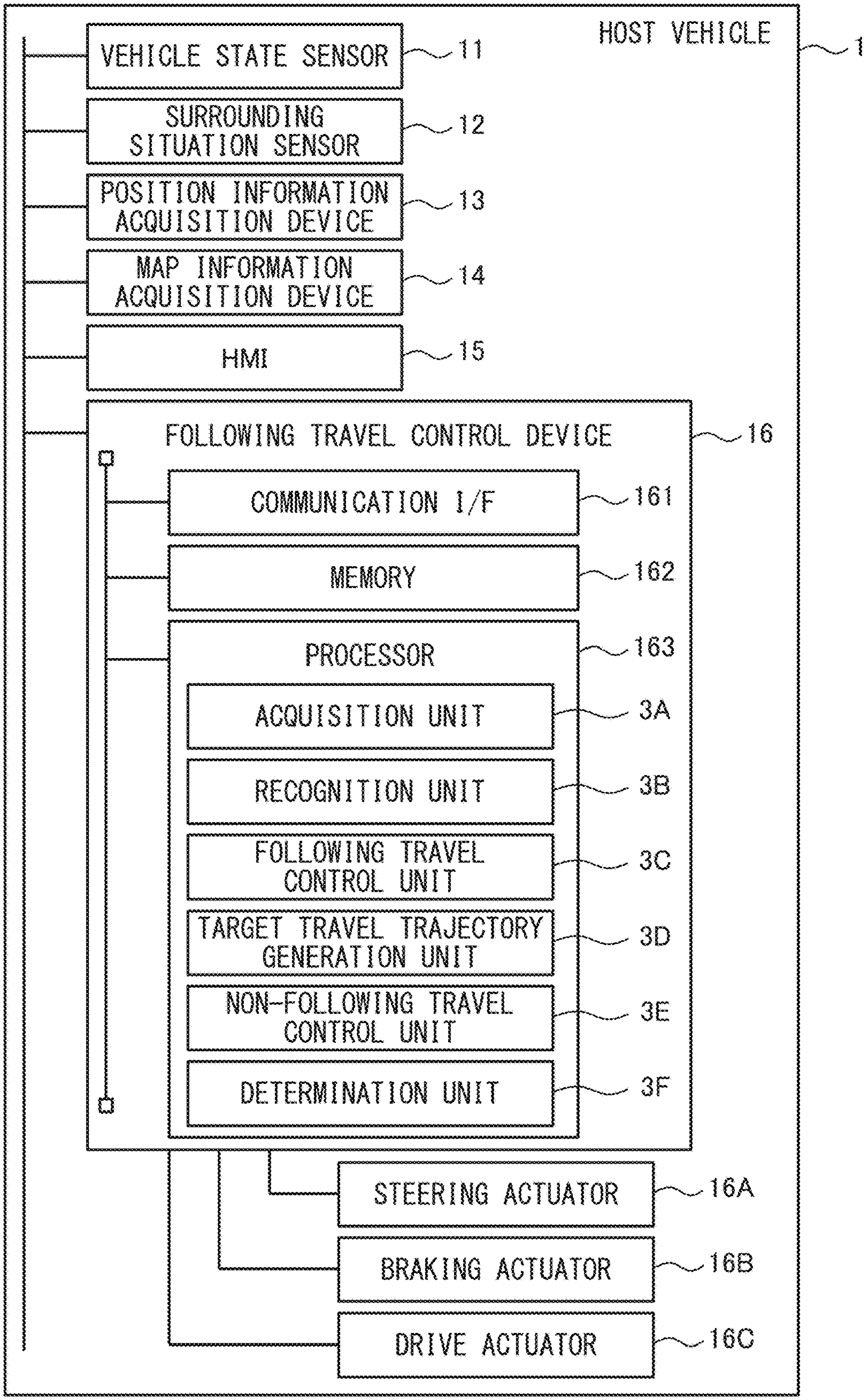
FIG. 1 is a view showing an example of a host vehicle 1 to which a following travel control device 16 of a first embodiment is applied.

Below, referring to the drawings, embodiments of following travel control device, following travel control method, and non-transitory recording medium of the present disclosure will be explained.

First Embodiment

FIG. 1 is a view showing an example of a host vehicle 1 to which a following travel control device 16 of a first embodiment is applied. In the example shown in FIG. 1, the host vehicle 1 includes vehicle state sensor 11, surrounding situation sensor 12, position information acquisition device 13, map information acquisition device 14, HMI (Human Machine Interface) 15, following travel control device 16, steering actuator 16A, braking actuator 16B, and drive actuator 16C. The vehicle state sensor 11 detects a state of the host vehicle 1. The vehicle state sensor 11 includes, for example, vehicle speed sensor, yaw rate sensor, acceleration sensor or the like. The vehicle state sensor 11 transmits the detection result of the state of the host vehicle 1 to the following travel control device 16. The surrounding situation sensor 12 detects surrounding vehicle (for example, preceding vehicle PV (refer to FIG. 2A to FIG. 2D), other vehicle OV (refer to FIG. 2B to FIG. 2D) or the like), person (for example, road crosser, pedestrian running out into a road or the like), traffic light, road sign, railroad crossing, obstacle or the like which exists around the host vehicle 1. The surrounding situation sensor 12 includes, for example, camera, LiDAR (Laser Imaging Detection and Ranging), radar, sonar or the like. The surrounding situation sensor 12 transmits the detection result of the surrounding vehicle or the like existing around the host vehicle 1 to the following travel control device 16. The position information acquisition device 13 acquires information indicating position and orientation of the host vehicle 1. The position information acquisition device 13 includes, for example, a GPS (Global Positioning System) device or the like for measuring the position and the orientation of the host vehicle 1. The position information acquisition device 13 may perform a well-known self-position estimation process (localization) and increase the accuracy of the information indicating the position and the orientation of the host vehicle 1. The position information acquisition device 13 transmits the information indicating the position and the orientation of the travel vehicle 1 to the following travel control device 16.

The map information acquisition device 14 acquires map information indicating lane layout, road shape and the like from a map database. The map database may be stored in a storage device (not shown) mounted on the host vehicle 1 or may be stored in a management server external to the host vehicle 1. In an example in which the map database is stored in the management server external to the host vehicle 1, the map information acquisition device 14 acquires the map information from the map database through communication between the host vehicle 1 and the management server. The map information acquisition device 14 transmits the map information indicating the lane layout, the road shape and the like to the following travel control device 16.

In the example shown in FIG. 1, the HMI 15 has the function of receiving various operations of the driver of the host vehicle 1 and transmits a signal indicating the operation of the driver of the host vehicle 1 to the following travel control device 16. The HMI 15 has the function of receiving the operation of the driver of the host vehicle 1 to turn on driving assistance function, for example, ACC (adaptive cruise control) or the like. Further, the HMI 15 has the function of receiving the operation for starting autonomous driving in which host vehicle 1 travels without steering operation, braking operation and accelerator operation of the driver or the host vehicle 1. The autonomous driving includes following travel in which the host vehicle follows the preceding vehicle PV without the steering operation, the braking operation and the accelerator operation of the driver or the host vehicle 1. That is, the HMI 15 has the function of receiving the operation for starting the following travel. Specifically, the HMI 15 has the function of notifying the driver of the host vehicle 1 that the following travel can be started (that is, proposing the start of the following travel to the driver of the host vehicle 1) prior to receiving the operation for starting the following travel. In addition, the autonomous driving includes non-following travel in which the host vehicle 1 travels autonomously along a target travel trajectory to be described later without the steering operation, the braking operation and the accelerator operation of the driver or the host vehicle 1. The HMI 15 includes a steering for receiving the operation of the driver of the host vehicle 1 (and a steering angle sensor), a brake pedal (and a sensor for detecting the operation amount of the brake pedal), an accelerator pedal (and a sensor for detecting the operation amount of the accelerator pedal) and the like.

The following travel control device 16 is configured by, for example, an autonomous driving ECU (Electronic Control Unit) (i.e., by one ECU). In another example, the following travel control device 16 may be configured by a plurality of ECU.

In the example shown in FIG. 1, the following travel control device 16 controls the steering actuator 16A, the braking actuator 16B, and the drive actuator 16C based on the detection results of the vehicle state sensor 11 and the surrounding situation sensor 12, the information acquired by the position information acquisition device 13 and the map information acquisition device 14, and the signal indicating the operation of the driver of the host vehicle 1 received by the HMI 15 or the like. The following travel control device 16 is configured by a microcomputer including communication interface (I/F) 161, memory 162 and processor 163. The communication interface 161 includes an interface circuit for connecting the following travel control device 16 to the vehicle state sensor 11, the surrounding situation sensor 12, the position information acquisition device 13, the map information acquisition device 14, the HMI 15, the steering actuator 16A, the braking actuator 16B, the drive actuator 16C and the like. The memory 162 stores program used in a process performed by the processor 163 and various data. The processor 163 has the function as an acquisition unit 3A, the function as a recognition unit 3B, the function as a following travel control unit 3C, the function as a target travel trajectory generation unit 3D, the function as a non-following travel control unit 3E, and the function as a determination unit 3F. The acquisition unit 3A acquires the detection results of the vehicle state sensor 11 and the surrounding situation sensor 12, the information acquired by the position information acquisition device 13 and the map information acquisition device 14, the signal indicating the operation of the driver of the host vehicle 1 received by the HMI 15, and the like. Specifically, the acquisition unit 3A acquires, for example, information (for example, weather information, information of the number of surrounding vehicles, information of narrowness of the travel route of the host vehicle 1, information indicating whether the driver of the host vehicle 1 is hurried, and the like) that indicates a situation of the host vehicle 1. The acquisition unit 3A may acquire operation status of a wiper of the host vehicle 1 and estimate the weather information based on the operation status, or acquire the weather information from WEB site or the like via network and communication device 17 (refer to FIG. 4). Alternatively, the acquisition unit 3A may directly acquire the weather information from the surrounding situation sensor 12 capable of performing weather observation. The acquisition unit 3A may estimate whether the driver of the host vehicle 1 is hurried based on the detection result (vehicle speed, acceleration, etc. of the host vehicle 1) of the vehicle state sensor 11 or estimate whether the driver of the host vehicle 1 is hurried based on the signal indicating the operation of the driver of the host vehicle 1 received by the HMI 15. The recognition unit 3B recognizes the preceding vehicle PV (refer to FIG. 2A to FIG. 2D) based on the detection result or the like of the surrounding situation sensor 12 acquired by the acquisition unit 3A. In an example in which the camera is used as the surrounding situation sensor 12, the recognition unit 3B recognizes the preceding vehicle PV by distinguishing the preceding vehicle PV from other vehicles based on features (for example, color, shape, number and feature value in machine learning) of the preceding vehicle PV included in a camera image. In an example in which the LiDAR is used as the surrounding situation sensor 12, the recognition unit 3B recognizes the preceding vehicle PV by distinguishing the preceding vehicle PV from other vehicles based on the feature of the shape of the preceding vehicle PV indicated by the detection result of the LiDAR. In an example in which the radar is used as the surrounding situation sensor 12, the recognition unit 3B recognizes the preceding vehicle PV by distinguishing the preceding vehicle PV from other vehicles based on the feature of reflected wave from the preceding vehicle PV indicated by the detection result of the radar.

The following travel control unit 3C performs the following travel control in which the host vehicle 1 follows the preceding vehicle PV without the need for the steering operation, the braking operation, and the accelerator operation by the driver of the host vehicle 1. The following travel control unit 3C controls the steering actuator 16A, the braking actuator 16B, and the drive actuator 16C so that the host vehicle 1 travels by following a travel track of the preceding vehicle PV. Even when the preceding vehicle PV performs lane change, right turn, left turn or the like, the following travel control unit 3C performs the following travel control so that the host vehicle 1 performs the lane change, the right turn, the left turn or the like by following the travel track of the preceding vehicle PV (more specifically, blinkers are turned on as required). When the preceding vehicle PV travels by avoiding an obstacle in a road construction section or the like, the following travel control unit 3C performs the following travel control so that the host vehicle 1 also travels by avoiding the obstacle in the road construction section or the like along the travel track of the preceding vehicle PV. When the host vehicle 1 to which the following travel control device 16 of the first embodiment is applied is used for a drive (trip), delivery operation of delivery services or the like, it is possible to greatly reduce fatigue of the driver of the host vehicle 1.

Figure 2D:
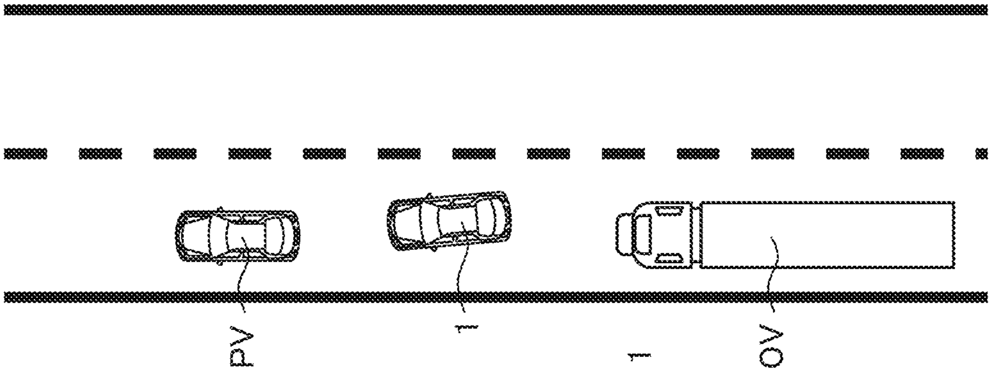
FIG. 2D shows a state in which the host vehicle 1 restarted following travel to the preceding vehicle PV.
Figure 2C:
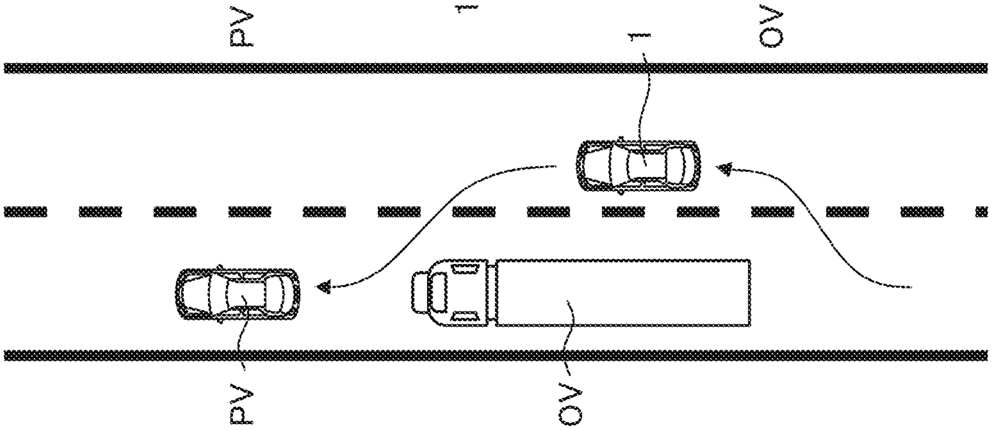
FIG. 2C shows a state in which the host vehicle 1 is overtaking the other vehicle OV which interrupted between the preceding vehicle PV and the host vehicle 1.
Figure 2B:
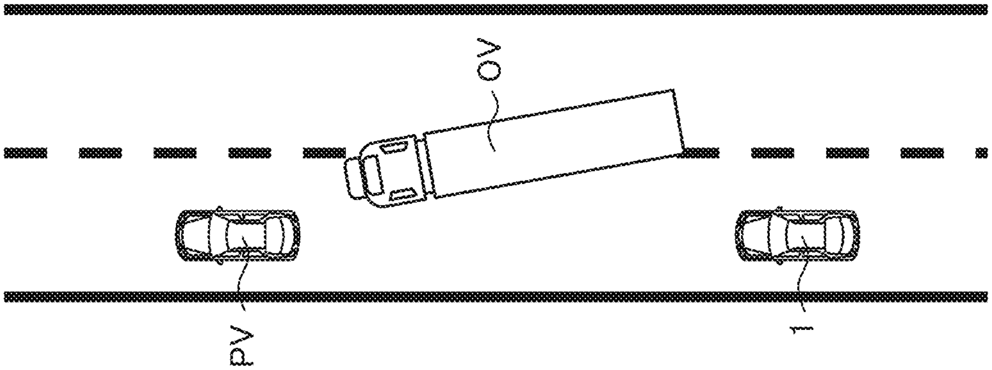
FIG. 2B shows a state in which an other vehicle OV is interrupting between the preceding vehicle PV and the host vehicle 1.
Figure 2A:
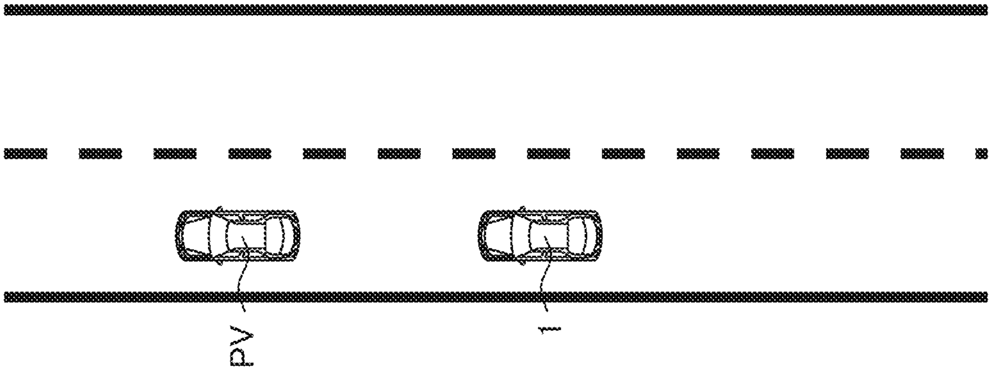
FIG. 2A shows a state in which the host vehicle 1 follows a preceding vehicle PV.

FIG. 2A to FIG. 2D are views for explaining an example of the following travel in which the host vehicle 1 follows the preceding vehicle PV. Specifically, FIG. 2A shows a state in which the host vehicle 1 follows the preceding vehicle PV, FIG. 2B shows a state in which the other vehicle OV is interrupting between the preceding vehicle PV and the host vehicle 1, FIG. 2C shows a state in which the host vehicle 1 is overtaking the other vehicle OV which interrupted between the preceding vehicle PV and the host vehicle 1, and FIG. 2D shows a state in which the host vehicle 1 restarted the following travel to the preceding vehicle PV. As shown in FIG. 2A, when circumstances in which the host vehicle 1 cannot follow the preceding vehicle PV does not occur, the following travel control unit 3C performs the following travel control in which the host vehicle 1 follows the preceding vehicle PV. When the other vehicle OV interrupts between the preceding vehicle PV and the host vehicle 1 as shown in FIG. 2B, if the following travel control unit 3C performs the following travel control continuously, there is a possibility that the host vehicle 1 contacts the other vehicle OV or the recognition unit 3B cannot recognize the preceding vehicle PV because the preceding vehicle PV is interrupted by the other vehicle OV (that is, the circumstances in which the host vehicle 1 cannot follow the preceding vehicle PV occur).

Therefore, in the example shown in FIG. 1, the target travel trajectory generation unit 3D generates the target travel trajectory of the host vehicle 1 which draws the travel track different from the travel track of the preceding vehicle PV. Specifically, in the example shown in FIG. 2A to FIG. 2D, the target travel trajectory generation unit 3D generates a travel trajectory of the host vehicle 1 for overtaking the other vehicle OV which interrupted between the preceding vehicle PV and the host vehicle 1 as shown by an arrow in FIG. 2C. Specifically, the target travel trajectory generation unit 3D determines whether overtaking of the other vehicle OV by the host vehicle 1 is possible based on the information (for example, the weather information, the information of the number of the surrounding vehicles, the information on the narrowness of the travel route of the host vehicle 1, the information indicating whether the driver of the host vehicle 1 is hurried, and the like) which indicates the situation of the host vehicle 1 acquired by the acquisition unit 3A before the target travel trajectory generation unit 3D generates the travel trajectory of the host vehicle 1 overtaking the other vehicle OV. The target travel trajectory generation unit 3D does not generate the travel trajectory of the host vehicle 1 overtaking the other vehicle OV when the target travel trajectory generation unit 3D determines that overtaking of the other vehicle OV by the host vehicle 1 is impossible.

In the example shown in FIG. 1, the non-following travel control unit 3E makes the host vehicle 1 travel autonomously (that is, without the need for the steering operation, the braking operation, and the accelerator operation by the driver of the host vehicle 1) along the target travel trajectory generated by the target travel trajectory generation unit 3D. Specifically, in the example shown in FIG. 2A to FIG. 2D, as shown in FIG. 2C and FIG. 2D, the non-following travel control unit 3E makes the host vehicle 1 travel along the target travel trajectory shown by the arrow in FIG. 2C and the host vehicle 1 overtakes the other vehicle OV. Specifically, in the example shown in FIG. 2A to FIG. 2D, the target travel trajectory generated by the target travel trajectory generation unit 3D is the target travel trajectory which can restart the following travel control, and the non-following travel control unit 3E makes the host vehicle 1 travel autonomously along the target travel trajectory. The following travel control unit 3C restarts the following travel control when the host vehicle 1 reaches a position where the host vehicle 1 can restart the following travel control as shown in FIG. 2D. That is, in the example shown in FIG. 2A to FIG. 2D, when circumstances (an interrupt caused by the other vehicle OV) in which the following travel control unit 3C cannot continue the following travel control occur as shown in FIG. 2B while the following travel control unit 3C performs the following travel control as shown in FIG. 2A, the following travel control unit 3C interrupts the following travel control, the recognition unit 3B continues to recognize the preceding vehicle PV, and the target travel trajectory generation unit 3D generates the target travel trajectory shown by the arrow in FIG. 2C which can restart the following travel control. Therefore, in the example shown in FIG. 2A to FIG. 2D, even when the circumstances in which the host vehicle 1 cannot follow the preceding vehicle PV occur, it is possible to appropriately continue the following travel to the preceding vehicle PV by the host vehicle 1.

In the example shown in FIG. 1, the determination unit 3F performs a determination whether recognition of the preceding vehicle PV by the recognition unit 3B is easy, and the like. For example, when the road on which the preceding vehicle PV and the host vehicle 1 are traveling extends in an approximate straight line without branching, the determination unit 3F determines that the recognition of the preceding vehicle PV by the recognition unit 3B is easy. When the determination unit 3F determines that the recognition of the preceding vehicle PV by the recognition unit 3B is easy, the following travel control unit 3C performs the following travel control by increasing the distance between the preceding vehicle PV and the host vehicle 1 than when the determination unit 3F determines that the recognition of the preceding vehicle PV by the recognition unit 3B is not easy. Therefore, it is possible to suppress the possibility that the driver of the preceding vehicle PV misunderstands that the host vehicle 1 is tailgating the preceding vehicle PV.

In the example shown in FIG. 1, in order to suppress the possibility that the driver of the preceding vehicle PV misunderstands that the host vehicle 1 is tailgating the preceding vehicle PV, a process to be described below can also be performed. Specifically, when the execution time of the following travel control by the following travel control unit 3C is a threshold or more, there is a possibility that the driver of the preceding vehicle PV misunderstands that the host vehicle 1 is tailgating the preceding vehicle PV. Therefore, the following travel control unit 3C performs the following travel control by increasing the distance between the preceding vehicle PV and the host vehicle 1 than when the execution time of the following travel control by the following travel control unit 3C is not the threshold or more. When the other vehicle OV interrupts between the preceding vehicle PV and the host vehicle 1 as shown in FIG. 2B (for example, when a predetermined time elapses after the other vehicle OV interrupts between the preceding vehicle PV and the host vehicle 1, or when the host vehicle 1 travels a predetermined distance after the other vehicle OV interrupts between the preceding vehicle PV and the host vehicle 1) while the following travel control unit 3C performs the following travel control by increasing the distance between the preceding vehicle PV and the host vehicle 1, the following travel control unit 3C interrupts the following travel control, the recognition unit 3B continues to recognize the preceding vehicle PV, the target travel trajectory generation unit 3D generates the target travel trajectory which can restart the following travel control, and the non-following travel control unit 3E makes the host vehicle 1 travel to the position where the host vehicle 1 can restart the following travel control along the target travel trajectory as in the example shown in FIG. 2A to FIG. 2D above. In another example, when it is predicted that the host vehicle 1 passes through an intersection or the like in which overtaking of the other vehicle OV by the host vehicle 1 is difficult based on, for example, the map information or the like, the non-following travel control unit 3E may start non-following travel control (the overtaking of the other vehicle OV by the host vehicle 1) before the predetermined time elapses.

In yet another example, the recognition unit 3B recognizes the preceding vehicle PV based on a front camera image of the camera which shoots the front of the host vehicle 1 as the detection result of the surrounding situation sensor 12 (that is, performs image recognition). The target travel trajectory generation unit 3D generates the target travel trajectory of the host vehicle 1 to move the host vehicle 1 in a direction (for example, rightward or leftward in width direction of the host vehicle 1) in which the degree of recognition of the preceding vehicle PV by the recognition unit 3B is increased, when the target travel trajectory generation unit 3D determines that the degree of recognition of the preceding vehicle PV by the recognition unit 3B is decreased after the other vehicle OV interrupts between the preceding vehicle PV and the host vehicle 1 based on, for example, the ratio of the preceding vehicle PV included in the front camera image before the other vehicle OV interrupts between the preceding vehicle PV and the host vehicle 1 and the ratio of the preceding vehicle PV included in the front camera image after the other vehicle OV interrupts between the preceding vehicle PV and the host vehicle 1.

In yet another example, when the recognition unit 3B cannot recognize the preceding vehicle PV based on the detection result of the surrounding situation sensor 12, for example, the target travel trajectory generation unit 3D estimates the position of the preceding vehicle PV based on the information indicating the shape of the travel route of the host vehicle 1 obtained from the map information acquired by the map information acquisition device 14, the detection result of the surrounding situation sensor 12, or the like. In addition, the non-following travel control unit 3E increases the vehicle speed of the host vehicle 1 more than before the recognition unit 3B can no longer recognize the preceding vehicle PV. In addition, the target travel trajectory generation unit 3D generates the travel trajectory of the host vehicle 1 which overtakes the other vehicle OV which interrupted between the preceding vehicle PV and the host vehicle 1 as the target travel trajectory, the other vehicle OV is the reason why the recognition unit 3B can no longer recognize the preceding vehicle PV. Therefore, it is possible to enable the host vehicle 1 to restart the following travel to the preceding vehicle PV.

In yet another example, the non-following travel control unit 3E increases the vehicle speed of the host vehicle 1 more than during the following travel control, when the distance between the preceding vehicle PV and the host vehicle 1 while the non-following travel control unit 3E makes the host vehicle 1 travel autonomously along the target travel trajectory becomes larger than the distance between the preceding vehicle PV and the host vehicle 1 during the following travel control, such as when the preceding vehicle PV does not stop at the traffic light but the host vehicle 1 stops at the traffic light, when the road on which the preceding vehicle PV is traveling and the road on which the host vehicle 1 is traveling diverge, or the like. Thus, it is possible to enable the host vehicle 1 to restart the following travel to the preceding vehicle PV.

Figure 3:
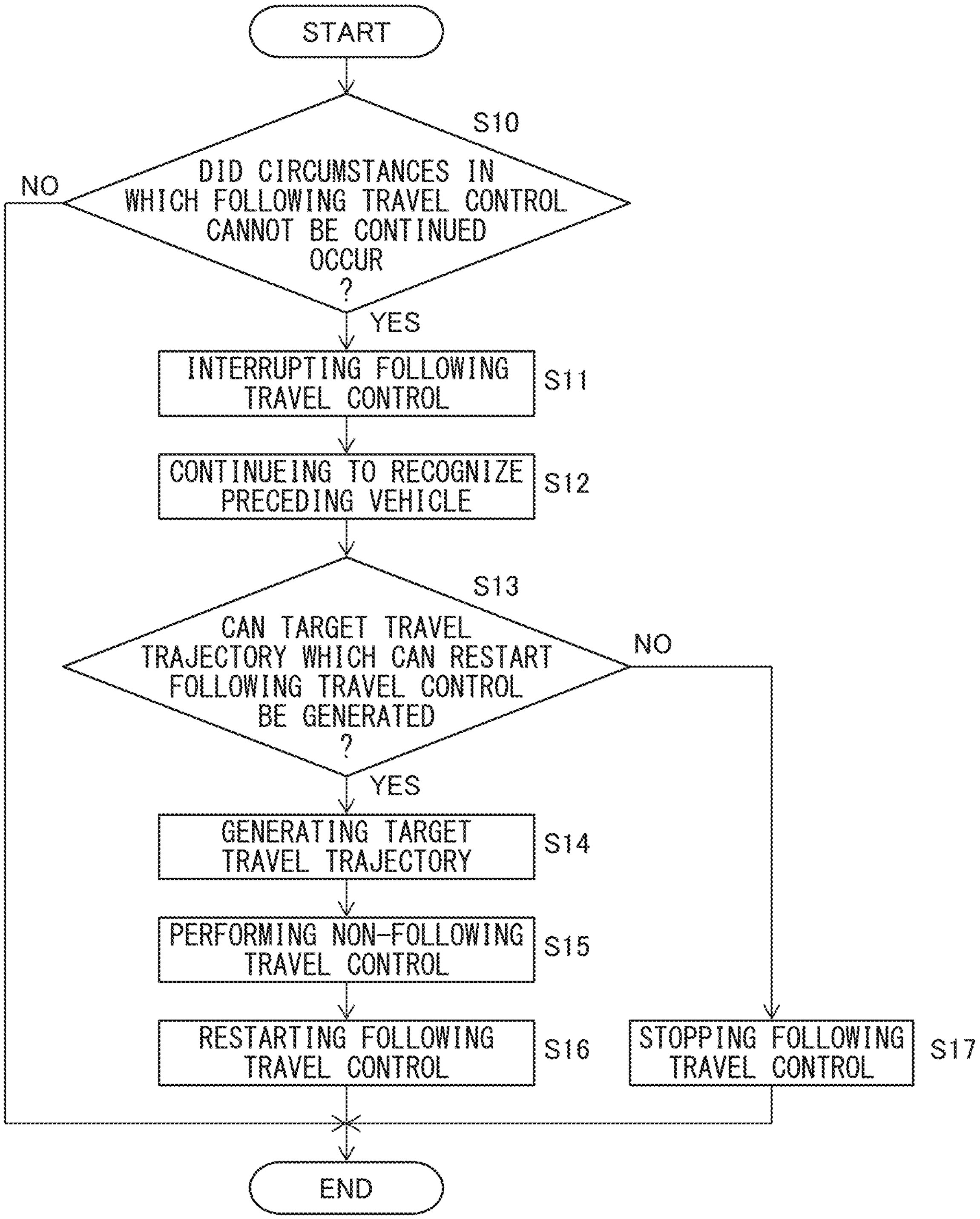
FIG. 3 is a flowchart for explaining an example of a process performed by a processor 163 of the following travel control device 16 of the first embodiment.

FIG. 3 is a flowchart for explaining an example of a process (in detail, process performed during the execution of the following travel control) performed by the processor 163 of the following travel control device 16 of the first embodiment. In the example shown in FIG. 3, at step S10, for example, the following travel control unit 3C determines whether the circumstances in which the following travel control cannot be continued occurred. If YES, it proceeds to step S11, while if NO, the process shown in FIG. 3 is ended. At step S11, the following travel control unit 3C interrupts the following travel control. At step S12, the recognition unit 3B continues to recognize the preceding vehicle PV. At step S13, for example, the target travel trajectory generation unit 3D determines whether the target travel trajectory generation unit 3D can generate the target travel trajectory which can restart the following travel control. If YES, it proceeds to step S14; while if NO, it proceeds to step S17. For example, when the recognition unit 3B loses the preceding vehicle PV and cannot recognize the preceding vehicle PV at branch, intersection or the like, it is determined NO at step S13. At step S14, the target travel trajectory generation unit 3D generates the target travel trajectory of the host vehicle 1. At step S15, the non-following travel control unit 3E performs the non-following travel control (that is, makes the host vehicle 1 travel autonomously along the target travel trajectory generated by the target travel trajectory generation unit 3D). When the host vehicle 1 reaches a position where the following travel control can be restarted, at step S16, the following travel control unit 3C restarts the following travel control. At step S17, the following travel control unit 3C does not restart the following travel control but stops the following travel control.

Even when the HMI 15 receives the operation of the driver of the host vehicle 1 which makes the following travel OFF, the following travel control unit 3C stops the following travel control at step (not shown). Even when the HMI 15 receives the steering operation, the braking operation, or the like by the driver of the host vehicle 1, the autonomous driving transfers to the manual driving, and the following travel control unit 3C stops the following travel control at step (not shown). When the dangerous driving such as ignoring the traffic light or the like by the preceding vehicle PV is detected by the surrounding situation sensor 12, when the behavior of the preceding vehicle PV which rejects the following travel to the preceding vehicle PV by the host vehicle 1 (for example, the behavior of the preceding vehicle PV giving the way to the host vehicle 1 by moving to the roadside, the behavior of the preceding vehicle PV starting suddenly, the behavior of the preceding vehicle PV (unnecessarily) repeating frequently the lane change, the right turn, the left turn, or the like) is detected by the surrounding situation sensor 12, when a person (for example, road crosser, pedestrian or the like) interrupts between the preceding vehicle PV and the host vehicle 1, or the like, the following travel by the host vehicle 1 cannot be continued safely, so that the following travel control unit 3C stops the following travel control at step (not shown).

Second Embodiment

The host vehicle 1 to which the following travel control device 16 of a second embodiment is applied is configured similarly to the host vehicle 1 to which the following travel control device 16 of the first embodiment described above is applied, except that it will be described later.

Figure 4:
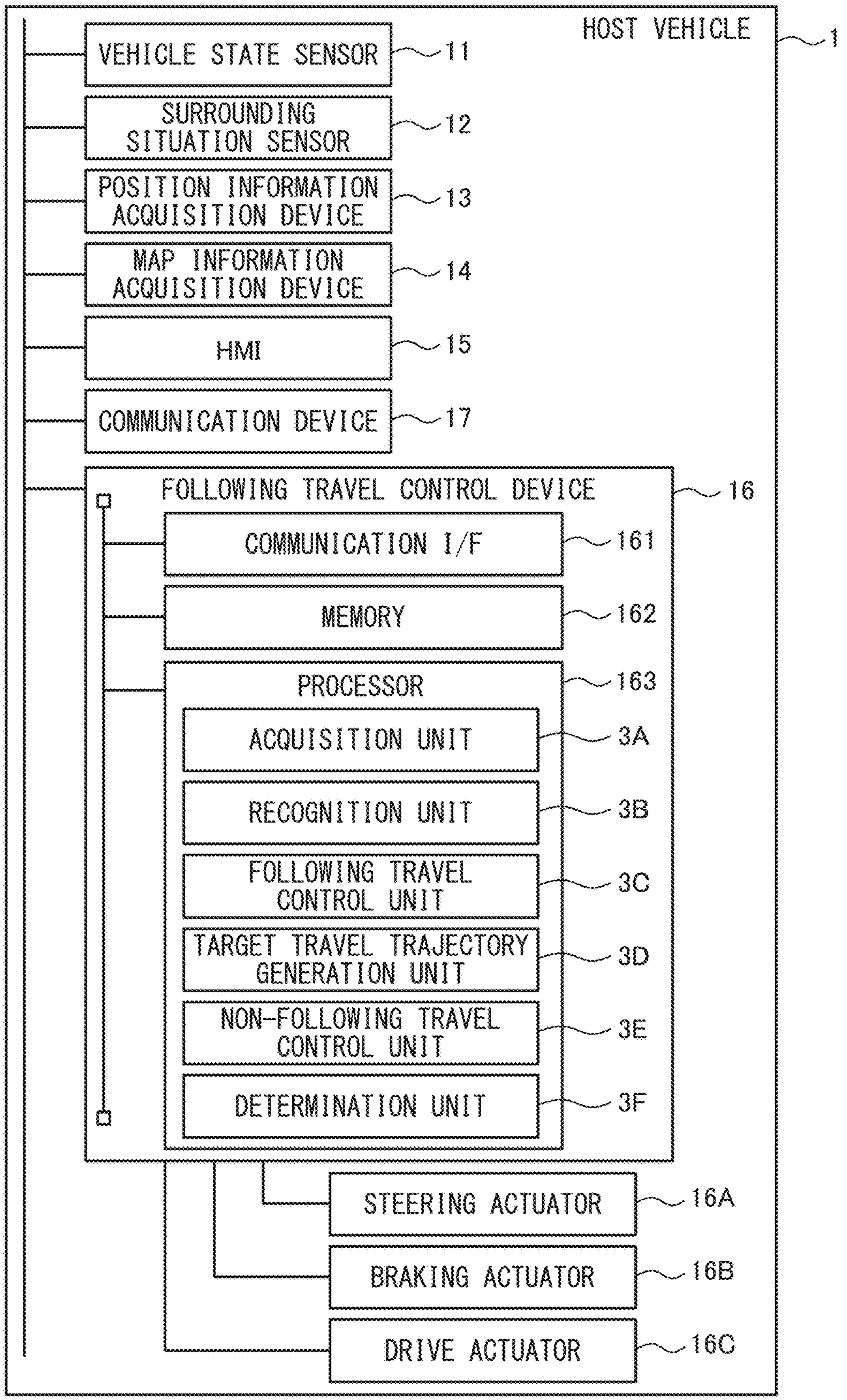
FIG. 4 is a view showing an example of the host vehicle 1 to which the following travel control device 16 of a first embodiment is applied.

FIG. 4 is a view showing an example of the travel vehicle 1 to which the following travel control device 16 of the second embodiment is applied. Although the host vehicle 1 is not provided with the communication device 17 (see FIG. 4) in the example shown in FIG. 1, the host vehicle 1 is provided with the communication device 17 in the example shown in FIG. 4. The communication device 17 performs inter-vehicle communication or the like with other vehicles such as, for example, the preceding vehicle PV or the like.

In the example shown in FIG. 4, the acquisition unit 3A acquires information of the preceding vehicle PV (for example, information indicating that the preceding vehicle PV is an autonomous driving vehicle, information indicating that the preceding vehicle PV is a vehicle owned by a friend, or the like) through the communication device 17. The determination unit 3F determines whether the following travel control can be performed without increasing the distance between the preceding vehicle PV and the host vehicle 1 based on the information of the preceding vehicle PV acquired by the acquisition unit 3A. When the determination unit 3F determines that the following travel control can be performed, the following travel control unit 3C performs the following travel control without increasing the distance between the preceding vehicle PV and the host vehicle 1. Therefore, it is possible to suppress the possibility that the driver of the preceding vehicle PV misunderstands that the host vehicle 1 is tailgating the preceding vehicle PV. In another example, the driver of the host vehicle 1 may enter the information of the preceding vehicle PV (for example, the information indicating that the preceding vehicle PV is the autonomous driving vehicle, the information indicating that the preceding vehicle PV is the vehicle owned by the friend, or the like) through the HMI 15, and the acquisition unit 3A may acquire the information. In yet another example, for example, the following travel control unit 3C may perform a request for decelerating to the preceding vehicle PV, a request for stopping at the roadside to the preceding vehicle PV, a request not to enter the intersection with a yellow signal to the preceding vehicle PV, or the like through the communication device 17 in order to suppress circumstances in which the host vehicle 1 cannot follow the preceding vehicle PV.

In yet another example, while the following travel control unit 3C performs the following travel control, the power consumed by at least the surrounding situation sensor 12 used for recognizing the preceding vehicle PV by the recognition unit 3B may be decreased (for example, by reducing the number of sensors used, reducing the sampling rate of the sensor, or the like) than when at least the non-following travel control unit 3E makes the host vehicle 1 travel autonomously along the target driving track. In another example, the following travel control unit 3C may estimate the destination of the preceding vehicle PV based on the detection result (for example, the place name of the license plate of the preceding vehicle PV, the destination display of the bus in a case in which the preceding vehicle PV is a bus, or the like) of the surrounding situation sensor 12 used for recognizing the preceding vehicle PV by the recognition unit 3B, and may set the preceding vehicle PV to the target vehicle to follow in the following travel control based on the comparison result between the destination of the host vehicle 1 and the destination of the preceding vehicle PV (specifically, when the destination of the host vehicle 1 and the destination of the preceding vehicle PV are close to each other). In yet another example, the acquisition unit 3A may acquire the timetable information of the bus as the preceding vehicle PV (for example, via the communication device 17 from WEB site of the bus company) and the following travel control unit 3C may select the bus which the host vehicle 1 should follow while performing the following travel control based on the time table information acquired by the acquisition unit 3A.

When the preceding vehicle PV is, for example, a motorcycle or the like and the width of the preceding vehicle PV is narrow, there is a possibility that the host vehicle 1 may not be able to travel by avoiding the obstacle in the road construction section only by the host vehicle 1 following the preceding vehicle PV. Therefore, in yet another example, for example, the following travel control unit 3C may correct the travel track of the preceding vehicle PV to be followed by the host vehicle 1 based on the detection result of the free space by the surrounding situation sensor 12 so that the host vehicle 1 can travel by avoiding the obstacle or the like in the road construction section. In another example, the following travel control unit 3C may determine whether the vehicle width of the preceding vehicle PV is equal to the vehicle width of the host vehicle 1 based on the detection result of the preceding vehicle PV by the surrounding situation sensor 12, and may perform the following travel control in which the host vehicle 1 follows the preceding vehicle PV when the vehicle width of the preceding vehicle PV is equal to the vehicle width of the host vehicle 1. In yet another example, the following travel control unit 3C may activate the braking actuator 16B of the host vehicle 1 based on the detection result of the lighting of the braking lamp of the preceding vehicle PV by the surrounding situation sensor 12 while executing the following travel control.

In yet another example, the following travel control unit 3C may estimate the presence of the tail of a traffic jam or estimate the lane change, the right turn, the left turn, or the like of the preceding vehicle PV based on the detection result of sudden deceleration, lighting of the blinker, lighting of the hazard lamp or the like of the distant preceding vehicle PV by the surrounding situation sensor 12. The following travel control unit 3C may move the host vehicle 1 to the rightmost lane before the preceding vehicle PV makes the right turn, or may adjust the vehicle speed so that the host vehicle 1 can change the lane to the right lane to ensure a state in which there is no parallel traveling vehicle on the right side of the host vehicle 1, based on the detection result of the lighting of the right blinker of the preceding vehicle PV by the surrounding situation sensor 12. The driver of the host vehicle 1 can has the demand of the following travel of the preceding vehicle PV to the following travel control device 16 (autonomous driving ECU) as well as the demand of the following travel of the preceding vehicle PV to the driver of the taxi.

As described above, although the embodiments of the following travel control device, the following travel control method, and the non-transitory recording medium of the present disclosure have been described with reference to the drawings, the following travel control device, the following travel control method, and the non-transitory recording medium of the present disclosure are not limited to the above-described embodiments, and may be appropriately changed without departing from the scope of the present disclosure. The configuration of each example of the embodiment described above may be appropriately combined. In each example of the above-described embodiment, the process performed in the following travel control device 16 has been described as a software process performed by executing a program, but the process performed in the following travel control device 16 may be a process performed by hardware. Alternatively, the process performed by the following travel control device 16 may be a combined process of both software and hardware. In addition, the program (the program for realizing the function of the processor 163 of the following travel control device 16) that is stored in the memory 162 of the following travel control device 16 may be recorded in a computer-readable storage medium (a non-transitory recording medium) such as, for example, a semiconductor memory, a magnetic recording medium, an optical recording medium, or the like for providing, distribution or the like.

The invention claimed is:

1. A following travel control device comprising a processor configured to:

recognize a preceding vehicle;

perform following travel control in which a host vehicle follows the preceding vehicle;

determine whether a road on which the preceding vehicle is traveling extends in a straight line without branching;

upon determination that the road on which the preceding vehicle is traveling extends in a straight line without branching, perform the following travel control by increasing a distance between the preceding vehicle and the host vehicle as compared to when the road on which the preceding vehicle is traveling does not extend in a straight line without branching;

determine whether another vehicle has cut-in between the host vehicle and the preceding vehicle;

upon determination that another vehicle has cut-in between the host vehicle and the preceding vehicle, determine whether a target travel trajectory can be generated which can restart the following travel control;

upon determination that the target travel trajectory can be generated which can restart the following travel control, generate the target travel trajectory of the host vehicle which draws a travel track different from the travel track of the preceding vehicle;

make the host vehicle travel autonomously along the target travel trajectory; and when the host vehicle reaches a position where the following travel control can be restarted, generate the target travel trajectory which can restart the following travel control.

2. The following travel control device according to claim 1, wherein the target travel trajectory is a travel trajectory of the host vehicle for overtaking an other vehicle which cut-in between the preceding vehicle and the host vehicle, the processor is configured to acquire information indicating a situation of the host vehicle and determine whether overtaking of the other vehicle by the host vehicle is possible based on the information indicating the situation of the host vehicle.

3. A following travel control method comprising:

recognizing a preceding vehicle;

performing following travel control in which a host vehicle follows the preceding vehicle;

determining whether a road on which the preceding vehicle is traveling extends in a straight line without branching;

upon determination that the road on which the preceding vehicle is traveling extends in a straight line without branching, performing the following travel control by increasing a distance between the preceding vehicle and the host vehicle as compared to when the road on which the preceding vehicle is traveling does not extend in a straight line without branching;

determining whether another vehicle has cut-in between the host vehicle and the preceding vehicle;

upon determination that another vehicle has cut-in between the host vehicle and the preceding vehicle, determining whether a target travel trajectory can be generated which can restart the following travel control;

upon determination that the target travel trajectory can be generated which can restart the following travel control, generating the target travel trajectory of the host vehicle which draws a travel track different from the travel track of the preceding vehicle;

making the host vehicle travel autonomously along the target travel trajectory; and when the host vehicle reaches a position where the following travel control can be restarted, generating the target travel trajectory which can restart the following travel control.

4. A non-transitory recording medium having recorded thereon a computer program for causing a processor to perform a process comprising:

recognizing a preceding vehicle;

performing following travel control in which a host vehicle follows the preceding vehicle;

determining whether a road on which the preceding vehicle is traveling extends in a straight line without branching;

upon determination that the road on which the preceding vehicle is traveling extends in a straight line without branching, performing the following travel control by increasing a distance between the preceding vehicle and the host vehicle as compared to when the road on which the preceding vehicle is traveling does not extend in a straight line without branching;

determining whether another vehicle has cut-in between the host vehicle and the preceding vehicle;

upon determination that another vehicle has cut-in between the host vehicle and the preceding vehicle, determining whether a target travel trajectory can be generated which can restart the following travel control;

upon determination that the target travel trajectory can be generated which can restart the following travel control, generating the target travel trajectory of the host vehicle which draws a travel track different from the travel track of the preceding vehicle;

making the host vehicle travel autonomously along the target travel trajectory; and when the host vehicle reaches a position where the following travel control can be restarted, generating the target travel trajectory which can restart the following travel control.

* * * * *